United States Patent [19]

Singleton et al.

[11] 4,085,199

[45] Apr. 18, 1978

[54] METHOD FOR REMOVING HYDROGEN SULFIDE FROM SULFUR-BEARING INDUSTRIAL GASES WITH CLAUS-TYPE REACTORS

[75] Inventors: Alan H. Singleton, Baden; Otto A. Homberg, Easton; Charles W. Sheldrake, Bethlehem, all of Pa.

[73] Assignee: Bethlehem Steel Corporation, Bethlehem, Pa.

[21] Appl. No.: 694,001

[22] Filed: Jun. 8, 1976

[51] Int. Cl.² .......................................... C01B 17/00
[52] U.S. Cl. ............................ 423/574 R; 423/576
[58] Field of Search ............... 423/573, 574, 576, 226, 423/228, 229

[56] References Cited

U.S. PATENT DOCUMENTS

| | | | |
|---|---|---|---|
| 1,915,364 | 6/1933 | Harrell | 423/574 |
| 2,834,653 | 5/1958 | Fleming et al. | 423/576 |
| 2,887,363 | 5/1959 | Viles | 423/574 X |
| 3,752,877 | 8/1973 | Beavon | 423/573 |
| 3,773,900 | 11/1973 | Roberts | 423/567 X |
| 3,781,445 | 12/1973 | Moss | 423/574 |
| 3,794,710 | 2/1974 | Merrill | 423/573 |
| 3,798,308 | 3/1974 | Tatterson | 423/574 |
| 3,832,454 | 8/1974 | Renault | 423/574 |
| 3,839,549 | 2/1972 | Groenendaal | 423/574 |
| 3,840,653 | 10/1974 | Diemer | 423/574 X |
| 3,848,071 | 11/1974 | Groenendaal et al. | 423/574 |
| 3,864,460 | 2/1975 | Connell | 423/574 |
| 3,989,811 | 11/1976 | Hill | 423/573 G |
| 4,001,386 | 1/1977 | Klein et al. | 423/574 L |

FOREIGN PATENT DOCUMENTS

| | | | |
|---|---|---|---|
| 716,264 | 9/1954 | United Kingdom | 423/573 |
| 744,908 | 2/1956 | United Kingdom | 423/573 |

OTHER PUBLICATIONS

Naber et al., "Chemical Engineering Progress" vol. 69, No. 12, Dec. 1973, pp. 29–34.

*Primary Examiner*—G. O. Peters
*Attorney, Agent, or Firm*—Joseph J. O'Keefe; Charles A. Wilkinson

[57] ABSTRACT

Integrating an absorption-desorption step, a Claus plant, and a catalytic hydrogen reactor in a recycle loop provides a gas-desulfuration plant that operates at a substantially zero emission level. Hydrogen sulfide is removed from industrial gas streams by absorption-desorption in a liquid absorbent. The resulting foul gas is then reacted with sulfur dioxide in a Claus reaction, i.e., the reaction of hydrogen sulfide with sulfur dioxide to form elemental sulfur and water. The tail gas from this Claus reaction is then passed through a catalytic hydrogenation reactor together with a supply of hydrogen to reduce the sulfur and sulfur compounds to hydrogen sulfide. The now reduced tail gas is then recycled back to the industrial gas, upstream of the absorption-desorption step.

15 Claims, 2 Drawing Figures

METHOD FOR REMOVING HYDROGEN SULFIDE FROM SULFUR-BEARING INDUSTRIAL GASES WITH CLAUS-TYPE REACTORS

CROSS REFERENCE TO RELATED APPLICATION

This application is related to a co-pending application entitled "Method for Substantially Complete Removal of Hydrogen Sulfide from Sulfur-Bearing Industrial Gases" filed concurrently with the present application in the names of M. O. Tarhan and D. Kwasnoski and assigned to the assignee of the present application.

BACKGROUND OF THE INVENTION

This invention relates to the removal of undesirable components from industrial gases and more particularly to the substantial elimination of hydrogen sulfide from such gases.

Industrial gases such as coke oven gas, natural gas and various artifically produced fuel gases are used either by industrial plants to make useful products or burned in suitable combustion apparatus to produce heat. These gases are composed of varying mixtures of hydrogen, carbon monoxide, various aliphatic and aromatic hydrocarbons, hydrogen sulfide, hydrogen cyanide, carbonyl sulfide and other combustibles. The presence of sulfur compounds in such industrial gases is undesirable because of possible corrosion of intermediate gas transmission lines and other apparatus by the gases, possible contamination of chemical substances made from the gases, and possible discharge of undesirable concentrations of sulfur oxides to the atmosphere during combustion of the gases.

In the past such industrial gases have often been treated by passing them through absorption-desortion processes of various types. These absorption-desorption processes give off so-called foul gases which are treated to recover the sulfur present in the gas and thus prevent its discharge to the atmosphere.

A. Some Typical Absorption-Desorption Processes

Typical absorption-desorption processes are the hot potassium carbonate process, the vacuum carbonate process, the amine processes, especially those using mono-, di-, and triethanolamine, and various other processes using organic solvents. The alkanolamine processes, and particularly the diethanolamine and monoethanolamine processes, have proven to be especially attractive from an industrial standpoint due to their attractive economics and relatively trouble-free operation. The monoethanolamine process in particular has proven to be very convenient and efficient in removing hydrogen sulfide and other sulfur compounds from sulfur containing gas streams. Monoethanolamine solutions can easily remove substantially the entire sulfur component from industrial gases so that the gas leaving the monoethanolamine absorber contains no more than 10 grains of sulfur per 100 standard cubic feet of gas exhausted, i.e. less than 0.2288 grams of hydrogen sulfide per one standard cubic meter. This amount of sulfur is quantitatively very minor.

B. Claus Process

These absorption-desorption processes, while effective to reduce the sulfur content of treated industrial gas to a very low level, regenerate the acid components of the gases in a more concentrated form. The regenerated "foul" gases have to be treated in turn to reduce their sulfur content in some satisfactory manner. Very frequently the foul gases from the absorption-desorption processes have been used to produce elemental sulfur by some variation of the Claus process. In this process a portion of the sulfur, usually in the form of hydrogen sulfide, is oxidized to sulfur dioxide and the sulfur dioxide and remaining hydrogen sulfide are then reacted in a catalytic or other type converter to form elemental sulfur and water. There are a number of industrial variations of the process in which either a portion of the initial hydrogen sulfide is oxidized to sulfur dioxide or a portion of the final elemental sulfur product is subsequently oxidized to sulfur dioxide for use in the Claus reaction.

A single Claus reactor exhibits a fairly poor conversion of sulfur based upon the amount of sulfur in the inlet foul gas and it is customary to use three or even four Claus reactors in series in order to effect recovery of more than 85 to 90% of the sulfur. The reason for the incomplete recovery of sulfur is that the reversible Claus reaction cannot be completed since sufficient water and sulfur vapor are always present in the reaction area to limit the desired reaction. The thermodynamic equilibrium of the traditional Claus reaction also does not favor completion of the reaction to the right. Carbon dioxide and water vapor in the feed gas are likewise diluents which shift the equilibrium of the reaction adversely. Hydrocarbons in the feed, furthermore, affect the efficiency of the reaction by increasing the formation of undesirable side reaction products such as carbonyl sulfide and carbon disulfide. The tail gas from the Claus plant may as a result of these various factors contain as much as 10% of the sulfur originally removed by the absorption system from the fuel gas.

Thus while the Claus process is fairly efficient and has the advantage over other sulfur recovery processes of producing a good quality, useable sulfur, it does have the disadvantage that there is invariably a residue of gas known as the tail gas in which either sulfur dioxide or hydrogen sulfide, or very frequently both, as well as carbonyl sulfide and carbon disulfide, remain. This tail gas must be disposed of in some manner and is frequently at this point discharged to the atmosphere after incineration.

While the total amount of residual sulfur compounds contained in the tail gas and discharged to the atmosphere is much reduced from the concentrations of sulfur in the original gas treated, there is still, due to inherent inefficiencies of the system, a residual amount of sulfur remaining in the tail gas which may be objectionable. The amount of this remaining sulfur can be decreased by subsequent processing, for example, by the use of several Claus-type processing reactors in series. However, due to the small amount of remaining sulfur compounds in the final tail gas, any further processing becomes more and more inefficient and expensive and there is a final minimum of sulfur which is almost impossible to remove.

C. Some Methods for Final-Treating the Tail Gas from a Claus Reactor

One fairly simple expedient for final treatment of sulfur containing tail gases has been to oxidize all the remaining sulfur to sulfur dioxide and then to wash the sulfur dioxide out of the gas with a simple water wash system. The wash water can then be used to make sulfuric acid if it is concentrated enough, or it can be discarded. However, the water containing the sulfur dioxide, if discarded to waste, represents an escape and loss of sulfur values. On the other hand, the amount of sulfur dioxide dissolved in the waste water is very frequently insufficient for really effective use as a source of sulfur.

A number of other processes have been proposed as cleanup processes for treatment of Claus-unit tail gas. Several of these depend upon treatment of the tail gas so that the residual sulfur occurs as hydrogen sulfide, which is then converted to sulfur in a so-called Stretford unit. There are a number of other proposals for improved cleanup of the tail gas including the use of improved catalysts in the Claus reactors, wet scrubbing, reaction with ammonia, high temperature sulfur dioxide removal, concentration of sulfur dioxide by absorption, catalytic sulfuric acid production, and absorption-desorption type chemical removal. Some of these proposals are applied to the tail gas after incineration to change all of the contained sulfur to sulfur dioxide. While some are fairly efficient, at least in the laboratory, in removing the sulfur components, few if any of these proposals are really satisfactory on an industrial scale and none is completely efficient in removing sulfur compounds.

A large number of processes have also been developed which specifically make use of the broad principle of recycling in order to increase the recovery of the sulfur compounds from a gas. For example, the tail gas from a Claus plant has been oxidized to convert all residual hydrogen sulfide to sulfur dioxide, and the sulfur dioxide has then been recycled back to the Claus reactor to replace a portion of the sulfur dioxide used in the reactor. In some proposals the sulfur dioxide has been absorbed from the tail gas into lime or the like and then regenerated from the lime and recycled into the Claus plant. A variation of this recycle arrangement would maintain an excess of hydrogen sulfide in the reacting gases resulting in an excess of hydrogen sulfide in the effluent from the reactor which excess is separated by any suitable means and passed to the sulfur burner which oxidizes hydrogen sulfide to sulfur dioxide for use in the Claus plant.

Several processes have been developed in which hydrogen sulfide and sulfur dioxide are reacted together in a liquid reaction medium of some suitable composition. The liquid reaction medium may be renewed at intervals by stripping volatilizable gases including, for example, hydrogen sulfide which is then recycled to the primary reactor. Occasionally an ammonium salt solution such as an ammonium sulfite solution has been used as the reaction or absorption solution and in these cases unreacted hydrogen sulfide or sulfur dioxide passing from the solution may be recycled back to the absorption solution. It has also been proposed to recycle the entire tail gas stream containing both sulfur dioxide and hydrogen sulfide from a Claus plant back to an original coke oven gas stream to react with the ammonia in the coke gas. More recently it has also been proposed to use a so-called molecular sieve to reversibly absorb hydrogen sulfide from a tail gas derived from a Claus plant and recycle it back to an absorption step.

D. Related Co-pending Method of Disposing of Tail Gas by Recycling

A co-pending application filed concurrently with the present application by M. O. Tarhan and D. Kwasnoski, referred to above under the heading "Cross References to Related Applications", discloses a novel process for the substantially complete elimination of sulfur-bearing tail gases wherein a reaction loop is established which includes an absorption-desorption process unit and a liquid-phase sulfur reaction unit. The feed gas stream is first desulfurized in the absorption-desorption unit and the resulting foul gas is then treated in the liquid phase reaction unit. The tail gas from the liquid-phase reaction is recycled back to the gas entering the absorption-desorption apparatus thus eliminating the tail gas. An excess of hydrogen sulfide is maintained in the liquid phase sulfur reaction apparatus to insure that no sulfur dioxide is recycled. Since the absorption-desorption system is extremely efficient in removing hydrogen sulfide from the combined gas stream, substantially all of the sulfur in the original feed gas can be removed. Less than 10 grains of sulfur values per 100 standard cubic feet of gas remain in the gas stream exhausted from the absorber. The process can be combined with a Claus type process wherein the foul gas derived from the absorption-desorption system initially passes through one or more Claus type reaction units prior to passage through the liquid phase sulfur reaction unit.

Claus units inevitably form some carbonyl sulfide if there is any carbon dioxide or carbon monoxide in the original foul gas. In addition, because of inefficiencies of the Claus reaction, which is run at high temperatures, there is always some sulfur dioxide left in the tail gas. Tarhan and Kwasnoski have found that by the use of a liquid phase sulfur process after a Claus type processes together with maintenance of an excess of hydrogen sulfide during reaction, the remaining sulfur dioxide is substantially completely removed from the gas stream and only hydrogen sulfide is recirculated back to the absorber. Hydrogen sulfide as explained above is substantially completely removed from the gas stream by alkanolamine solutions.

E. Increasing the Efficiency of Claus-Reactor Gas Desulfurisation by the Inclusion of Catalytic Hydrogenation The present inventors have discovered that conventional Claus units, i.e. gas phase reaction units, can be rendered more efficient by passing the tail gas first through a catalytic hydrogenation reactor together with some hydrogen from any suitable source in order to hydrogenate all sulfur dioxide or carbonyl sulfide in the gas to hydrogen sulfide and that the tail gas may then be recycled back to the absorption-desorption system where the hydrogen sulfide is removed from the tail gas. The hydrogen sulfide passes into the foul gas which is again passed through the Claus plant to form elemental sulfur and water. The use of the hydrogenation reactor in the recycle loop removes sulfur which has been converted to carbonyl sulfide by the Claus thermal reactor. It also enables the use either of a single or a minimum number of Claus catalytic reactor units to process the hydrogen sulfide in the foul gas. The efficiency and economy of the entire process is thus considerably enhanced.

While prior and contemporary workers have, therefore, used the principle of recycling in various ways in connection with sulfur removal systems for the desulfurization of industrial gas, no prior worker has realized that an absorption-desorption process through which one passes all of the gas to be desulfurized could be combined in a single recycle loop with a Claus process and a catalytic hydrogenation process in order to completely eliminate any tail gas and maintain a minimum sulfur content in the gases exhausted from the system.

F. Prior Use of Catalytic Reduction of Claus Plant Tail Gas

U.S. Pat. No. 3,794,710 to J. J. Merrill discloses a process in which sulfur plant tail gases comprising sulfur dioxide, carbonyl sulfide, carbon disulfide and hydrogen sulfide derived from a Claus type reaction are treated first in an oxidizing zone to convert carbonyl sulfide to sulfur dioxide and carbon dioxide and then in a hydrogenating zone to hydrogenate the oxidized gas stream and form a hydrogenated gas stream, the principle components of which will be hydrogen sulfide and carbon dioxide from which gas stream the hydrogen sulfide is then scrubbed to obtain a purified gas stream. The so-called Stretford process is the preferred process for scrubbing the hydrogen sulfide containing gas stream in order to remove the last vestiges of hydrogen sulfide. Merrill does not disclose the use of the hydrogenation reactor in a recycle loop including an alkanolamine absorber and a Claus plant. Thus Merrill uses a much more expensive arrangement than is used by the present Applicants.

U.S. Pat. No. 3,848,071 to W. Groenendaal discloses a process in which tail gases from a Claus plant are subjected to a catalytic reduction step to reduce contained sulfur oxides to hydrogen sulfide. The hydrogen sulfide is then removed from the gas stream with either a solid absorbent or an absorbing solution of some suitable type. It is stated that the absorbents are preferably regeneratable and that any hydrogen sulfide-containing gas liberated during regeneration may be recycled back to the Claus plant. There is no disclosure by Groenendaal of the recycling of the hydrogen sulfide back through a single absorbent desulfurization loop through which all of the gas passes. Groenendaal's contribution to the art was the injection into the Claus feed stream of a hydrocarbon which breaks down in the Claus process to provide sufficient carbon monoxide and hydrogen to serve to reduce sulfur oxides and thus eliminates the necessity of having a reducing gas such as hydrogen or carbon monoxide available. There is no disclosure of the use of some of the original feed gas prior to absorption of the sulfur values as a reducing gas.

SUMMARY OF THE INVENTION

The problems and difficulties associated with the prior art methods of removing minor amounts of sulfur remaining in gases after conversion of the major portion of the sulfur content of the gas to elemental sulfur have now been obviated by the present invention. In accordance with the invention the principal amount of the sulfur content of a gas is absorbed in the form of hydrogen sulfide from a feed gas stream by passing the gas through an absorption-desorption type acid gas removal apparatus. The absorbed acid gases are then regenerated from the absorption medium and the hydrogen sulfide containing foul gas from the desorption step is treated with sulfur dioxide in the reaction zones of a Claus plant in substantially a stoichimetric ratio of two volumes of hydrogen sulfide with one volume sulfur dioxide in order to form elemental sulfur and water. The Claus type process operates at a high temperature and thus produces a tail gas containing minor amounts of sulfur as hydrogen sulfide, sulfur dioxide, carbonyl sulfide, and carbon disulfide. This tail gas is passed through a catalytic hydrogenation reactor to hydrogenate all the sulfur compounds back to hydrogen sulfide. The hydrogen sulfide containing tail gas is then recycled directly back to the original hydrogen sulfide containing fuel gas stream prior to its entrance into the absorption-desorption apparatus. Alternatively the tail gas may be introduced directly into the absorption-desorption step.

By operation in accordance with the present invention it is possible to remove a maximum amount of sulfur components from a gas stream by the use of a Claus plant and still use only one or two Claus reactors. The process is extremely efficient and results in a minimum escape of sulfur containing gases to the atmosphere.

When the process of the invention is used for the removal of sulfur from a coke oven or similar gas, which will usually be the primary and best use of the invention, it is preferable to obtain the hydrogen for use in the hydrogenation reactor by the use of the original coke oven gas prior to its entrance into the absorption-desorption system. In this manner it is possible to avoid the purchase or manufacture of hydrogen specifically for use in the tail gas hydrogenation reactor. In some cases it may be desirable, however, to add a little extra hydrogen from an additional source into the gas being passed into the tail gas hydrogenation reactor. It is, of course, also broadly contemplated that where the economics are favorable, or for other reasons, that hydrogen as such may be passed into the tail gas hydrogenation reactor with the tail gas in order to carry out the hydrogenation reaction.

DESCRIPTION OF THE PREFERRED EMBODIMENTS

The present invention in brief provides a process by which the tail gas from a Claus plant can be recycled to the feed point of a fuel gas desulfurization plant in order to obtain a very efficient removal of sulfur components from the fuel gas and at the same time provide a process from which no deleterious tail gas is emitted or discharged. The desulfurization plant can utilize any of a number of absorption-desorption processes such as those based on sodium or potassium carbonate, mono-, di- or triethanolamine, ammonia or various organic compounds. However, for maximum sulfur removal and thus minimum sulfur discharge via the desulfurized fuel gas, processes based on alkanolamine and particularly ethanolamines are preferred.

In the process of the invention a fuel gas such as a sour coke oven gas enters the desulfurization plant, which is an absorption-desorption type plant, where hydrogen sulfide, carbonyl sulfide, carbon disulfide, and a portion of the carbon dioxide in the fuel gas is removed in an absorbing or absorbent solution. The desulfurized fuel gas, which will preferably be desulfurized coke oven gas, since it has been found that coke oven gas is particularly applicable for use in accordance with the invention, passes from the absorption-desorption apparatus with perhaps 2% carbon dioxide content by volume and less than 0.01% hydrogen sulfide content by volume. The desulfurized gas may then be used in any normal manner in further industrial synthesization processes or burned as a fuel gas.

The sulfur compounds which have been absorbed from the desulfurized fuel gas are then desorbed or stripped from the absorbing or absorbent solution. The sulfur compounds such as hydrogen sulfide, which is the predominant sulfur compound, and other contaminating sulfur compounds such as carbonyl sulfide and carbon disulfide together with some carbon dioxide, leave the desulfurization plant after desorption as a foul gas stream which is then passed as a feed gas to a Claus sulfur recovery plant which operates according to the well known chemistry:

Reaction I $H_2S + 3/2O_2 \rightarrow SO_2 + H_2O$

Reaction II $SO_2 + 2H_2S \rightarrow 2H_2O + 3S$

The overall reaction thus may be expressed as:

Reaction III $3H_2S + 3/2O_2 \rightarrow 3S + 3H_2O$

Typically air is used to supply the oxygen to completely oxidize one third of the hydrogen sulfide in the foul gas stream to sulfur dioxide and water. The air is mixed with the foul gas stream in less than stoichiometric amounts and burned in a foul gas burner, after which the resultant sulfur dioxide and hydrogen sulfide mixture is reacted in a thermal reactor and a catalytic fixed bed reactor, which is packed with activated alumina or bauxite or other suitable catalysts, to produce elemental sulfur according to Reaction II above. Small quantities of carbonyl sulfide and carbon disulfide are also formed in the foul gas burner as a result of the reaction of hydrocarbons and carbon dioxide with sulfur compounds in the reducing atmosphere which is present during the partial oxidation reaction. Claus reactors, which are primarily high temperature reactors, are particularly liable to these side reactions. Reaction II above is an equilibrium reaction which cannot be driven to completion, i.e. it is impossible to react together all of the sulfur dioxide and hydrogen sulfide present in a practical system with a reasonable number of catalytic reactors.

Thus, when Reaction II has been driven to a feasible degree of completion and the gas stream has been cooled so as to condense elemental sulfur the residual tail gas contains from parts per million to actual whole or integer percentage quantities of carbonyl sulfide, carbon disulfide, hydrogen sulfide, elemental sulfur vapor, and sulfur dioxide. Because of the high toxicity of carbonyl sulfide, carbon disulfide, and hydrogen sulfide relative to sulfur dioxide, it has been the practice in the past to incinerate the residual tail gas by mixing it with the required quantity of fuel gas and an excess of combustion air to insure the complete combustion of all sulfur compounds to sulfur dioxide which is then vented to the atmosphere diluted by the combustion gases. The product sulfur is, as mentioned above, condensed and is then passed, usually initially in the form of molten sulfur, from the Claus plant to some storage facilities from which it may eventually be used for various purposes. The sulfur product may be used either as elemental sulfur or it may be oxidized to produce sulfur dioxide and ultimately sulfur trioxide for use in a contact type sulfuric acid plant.

The key feature of the present invention involves a processing scheme that permits the recycling of the tail gas from the Claus plant or reactors to the coke oven gas ahead of the desulfurization plant or apparatus. Such recycling has not been found feasible in the past due to the presence of highly corrosive and highly reactive sulfur dioxide, sulfur, carbonyl sulfide and carbon disulfide in the tail gas stream. However, in accordance with the present invention the tail gas which contains the sulfur dioxide, elemental sulfur, carbonyl sulfide and carbon disulfide is passed through a catalytic hydrogenation zone in a hydrogenating reactor together with a supply of hydrogen to completely hydrogenate the sulfur compounds to hydrogen sulfide, water and methane. The catalytic hydrogenation reactor may be of the usual type using a fixed bed and mild conditions including dilute hydrogen, ambient pressures, and temperatures in the range of 200° to 500° C (392° to 932° F). Any known hydro-treating catalysts such as sulfided cobalt molybdate on alumina may be used. The hydrogenated tail gas containing only hydrogen sulfide, methane, water, carbon dioxide and nitrogen can then be recycled to the feed gas of a monoethanolamine (MEA) desulfurization plant without detrimental effects.

In the case where the fuel gas which is being desulfurized is a coke oven gas or similar fuel gas containing hydrogen, it is very advantageous and preferable in order to obtain the required hydrogen for use in the hydrogenation in the hydro-treating reactor, to pass a portion of the coke oven gas or other fuel gas prior to desulfurization in the absorption-desorption apparatus into the hydrogenation reactor. The hydrogen that is a normal constituent of fuel gas such as coke oven gas can then react directly with the sulfur compounds which enter the hydrogenation reactor with the tail gas from the Claus plant. The relatively small amount of undesulfurized fuel gas used in the hydrogenation reactor ultimately passes from the hydrogenation reactor back into the feed gas line and hence into the desulfurization plant where it is desulfurized. Alternatively, of course, the mixture of hydrogenated tail gas and undesulfurized fuel gas can be passed directly into the absorption apparatus rather than being first mixed into the coke oven gas or other fuel gas which is entering the absorption apparatus.

Implementation of desulfurization in accordance with the present invention very substantially reduces the cost of the Claus plant inasmuch as the plant need no longer be designed with a large number of reactors in series in order to achieve high sulfur recovery from the foul gas. For example, in Table IV of an article by C. B. Barry entitled "Reduced Claus Sulfur Emission", in Hydrocarbon Processing, page 102, April 1972, it is disclosed that a Claus plant receiving 40% hydrogen sulfide in its foul gas feed and operating with four reactors in series will have a usual sulfur recovery effiency of approximately 96.1%. Claus reactors, however, are expensive units and are tricky in operation where any sort of varying gas feed passes to them. With the recycle process of the present invention in operation, however, it no longer becomes important to achieve high final sulfur recoveries since unreacted sulfur compounds are no longer discharged from the apparatus at all. the only sulfur compounds leaving the apparatus are the very small amounts which pass from the desulfurizer with the desulfurized fuel gas and the elemental sulfur product which is removed from the Claus plant.

In accordance with the present invention a single Claus reactor or at most two Claus reactors can be used. A single Claus reactor following the customary thermal reactor may effect a sulfur conversion in about the 90 to 92% range, while a double catalytic Claus reactor installation may achieve a sulfur conversion efficiency of about 95%. Such efficiencies when operated together with the recycle arrangement of the present invention are quite sufficient to provide a very efficient overall sulfur removal. The savings in eliminating two or three Claus reactors more than offset the capital cost of the tail gas hydrogenation reactor of the invention. Furthermore, the process in accordance with the present invention is much more efficient than an equivalent Claus type sulfur recovery plant which does not use the process of the invention. The percent removal of sulfur from the gas is very high and since all of the tail gas from the Claus plant is recycled there is no exhaust of tail gas of any sort to the atmosphere. In addition, since all of the tail gas is recycled back into the system and eventually ends up again in the Claus reactors, it is not necessary to operate the Claus reactors at their maximum efficiency. The operation of the Claus reactors, therefore, is not as sensitive and need not be monitored as closely as is necessary in prior Claus systems. Recycling of the fuel gas which is used as a hydrogenation medium back to the original fuel gas stream in addition enables the efficient use of the fuel gas stream as a primary source of hydrogen for the hydrogenation reaction.

Figure 1:
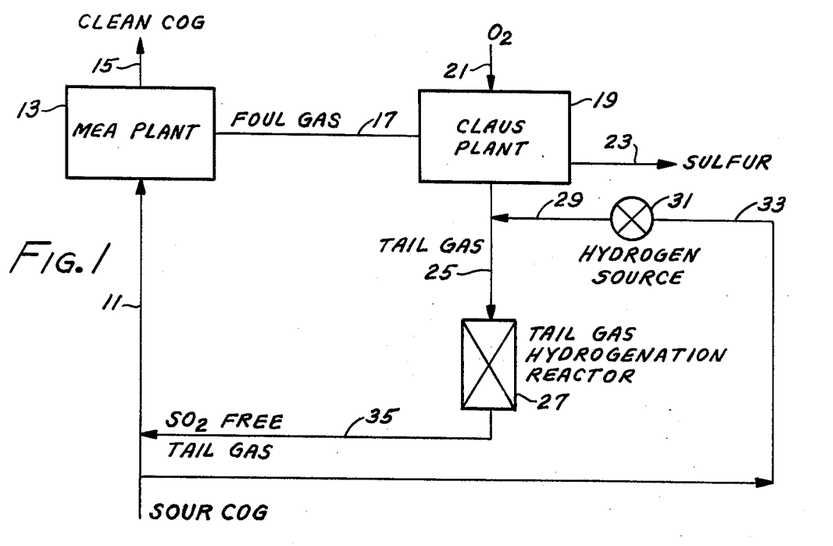
FIG. 1 is a block type flow sheet illustrating the process of the present invention in broad outline.

The operation of the invention may be more clearly understood with reference to the following description of an example of the present invention and with reference to FIG. 1 wherein a sour coke oven gas containing about 2% carbon dioxide, about 0.5% hydrogen sulfide and traces of carbonyl sulfide and carbon disulfide enter through a feed line 11 which is shown passing to an MEA type desulfurization plant 13. While an alkanolamine or ethanolamine absorbing solution such as mono-, di-, or triethanolamine is preferred, it will be understood that other suitable absorbent solutions or liquids such as aqueous ammonia, aqueous sodium or potassium carbonate or organic esters of a polyhydroxyalcohol such as propylene carbonate or glycerol triacetate may be used. As will be readily understood the MEA desulfurization plant 13 will comprise an absorption apparatus, not shown, and a desorption apparatus, also not shown. The sour coke over gas is desulfurized in the MEA or other desulfurization plant apparatus and passes from the desulfurization plant as a clean coke oven gas, containing about 2% carbon dioxide and less than 0.01% hydrogen sulfide, through desulfurized gas line 15. The sulfur compounds absorbed in the absorption apparatus are then desorbed in the desorption apparatus of the desulfurization plant and the desorbed foul gas is passed through a line 17 to a Claus plant shown as block 19.

Oxygen in the form of $O_2$ from the atmosphere is fed to the Claus plant through line 21. As will be well understood by those skilled in the art, the $O_2$ is reacted in the Claus plant with a portion of the hydrogen sulfide in the foul gas entering the Claus plant from line 17 to provide sulfur dioxide which is then reacted in accordance with the well known Claus Reaction II above to form elemental sulfur and water from the hydrogen sulfide. Alternatively, of course, as is also well known to those skilled in the art, a portion of the sulfur product from the Claus plant could be oxidized by the $O_2$ to form sulfur dioxide for use in the Claus plant. The sulfur product from the Claus plant leaves the plant 19 through the sulfur product line 23.

The tail gas from the Clause plant is passed through a line 25 to a tail gas hydrogenation reactor 27. A line 29 from a hydrogen source 31 passes hydrogen into the tail gas line 25 just prior to the entrance of the tail gas into the tail gas hydrogenation reactor 27. Preferably an additional line 33 which may take the form of a bleed-off line is provided as a connection between the feed gas line 11 and the hydrogen source 31 to conduct a portion of the feed gas, which in the example given is a coke oven gas, to the hydrogen source 31, which may be a small storage tank or the like for the coke oven gas. Alternatively an additional source of hydrogen may be maintained in the source 31 to mix with the hydrogen of the coke oven gas in order to increase the percentage of hydrogen in such gas prior to the time that it is passed to the tail gas hydrogenation reactor through the line 29 and tail gas line 25. It is preferable, in order to have as high a percentage of hydrogen in the gas from the feed gas line as possible, to bleed off the coke oven gas or similar gas from the feed line 11 for use in the hydrogenation reactor prior to the entrance of the gas from the recycle line 35 into the feed line 11.

In the tail gas hydrogenation reactor 27 the tail gas from the Claus plant is reacted with the hydrogen from the coke oven gas or hydrogen source to convert the various sulfur products in the tail gas to their hydrogenated form in accordance with the following reaction:

Reaction IV  $S + H_2 \rightarrow H_2S$

Reaction V  $COS + 4H_2 \rightarrow CH_4 + H_2O + H_2S$

Reaction VI  $CS_2 + 4H_2 \rightarrow CH_4 + 2H_2S$

Reaction VII  $SO_2 + 3H_2 \rightarrow H_2S + 2H_2O$

These reactions effectively convert all the sulfur compounds, and also the small amount of vaporized sulfur product which passes from the Claus plant even after condensation of the major portion portion of the liquid sulfur product, to hydrogen sulfide. This hydrogen sulfide then passes through the recycle line 35 back to the feed gas line 11. The recycle line carries a gas which is completely or substantially free of sulfur dioxide and which contains predominantly hydrogen sulfide, methane, water, carbon dioxide and nitrogen. Some small amount of unreacted hydrogen and other minor components from the hydrogenating gas will also be present. It will be recognized that some of the hydrogen sulfide, methane, water, carbon dioxide, and possibly some small amount also of hydrogen cyanide, which pass through the line 35 will have been derived from the original feed gas in the line 11 through the bleed-off line 33 which provides hydrogen for use in the tail gas hydrogenation reactor 27. However, it has been found that it is not detrimental to pass this original coke oven gas into the tail gas and through the hydrogenation reactor 27 prior to the time that such fuel gas, i.e. the coke gas, passes through the MEA desulfurization plant, since the residual fuel gas which is passed together with the hydrogenated tail gas via line 35 back into the main fuel gas stream in line 11 through the line 35 will immediately be directed to the MEA desulfurization plant where the hydrogen sulfide will be substantially almost completely removed from the coke oven gas.

If the fuel gas which is used as a hydrogenating gas is taken from some source other than the original feed gas line 11, the concentration of hydrogen in the gas will be less. However, as an alternative, if a somewhat lower concentration of hydrogen is acceptable, a portion of the desulfurized fuel gas can be bled off the clean gas line 15 for use in the hydrogenation reactor 27. In such an event, as well as when some external hydrogen source such as, for example, liquid hydrogen in the usual cylinders or the like, is used, there would be no additional hydrogen sulfide or other like compounds added to the tail gas beyond those derived from the Claus plant. Under such circumstances it may be practical to merely treat the tail gas after hydrogenation in some small apparatus, since only small amounts of hydrogen sulfide would be involved. It will be seen that the use of the recycle line 35 makes the use of the original fuel gas such as the coke oven gas as a hydrogen source for the tail gas hydrogenation reactor practical without prior treatment. Without the use of such recycles line 35 the original fuel gas could not be effectively used as a hydrogen source for a tail gas hydrogenation reactor, since the fuel gas, which contains substantial amounts of hydrogen sulfide, would then have to be treated by some further process which would require a fairly substantial apparatus for effective operation. The recycle arrangement is, however, very desirable regardless of the source of the hydrogen in order to close the system and prevent the escape of any sulfur from the system and is consquently an integral part of the present invention.

Figure 2:
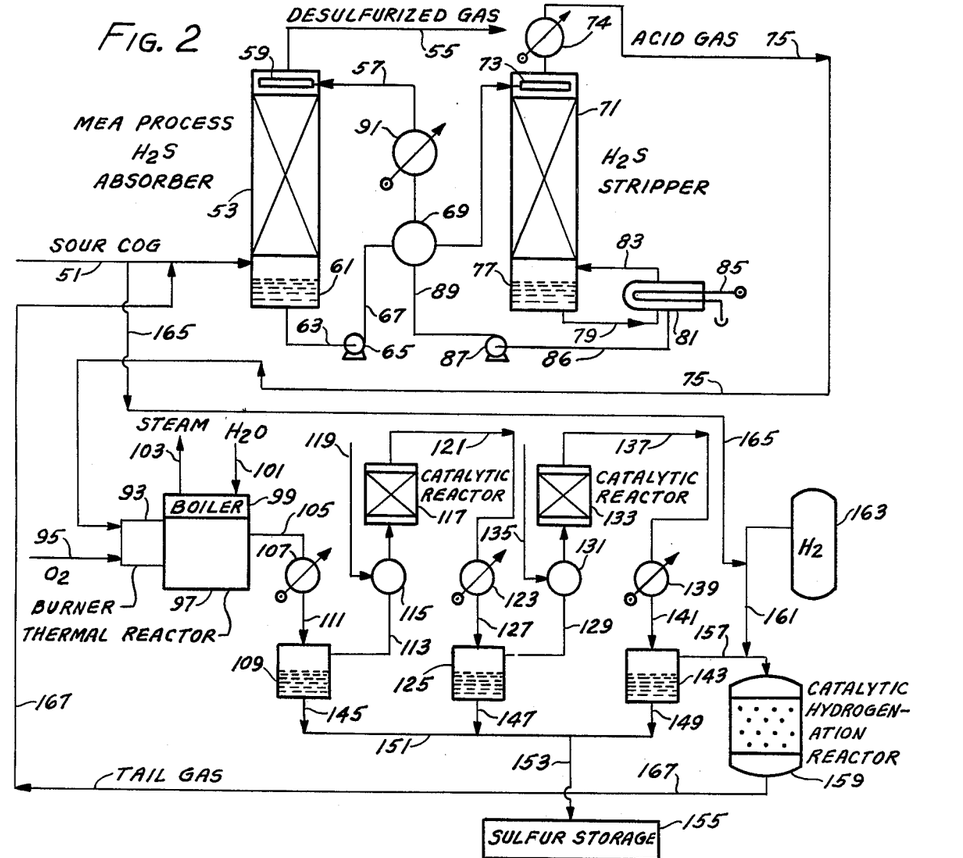
FIG. 2 is a schematic type flow diagram showing the details of one specific embodiment of the invention.

In FIG. 2 are shown, by the use of a schematic apparatus type flow diagram, further details of the process in accordance with the invention broadly outlined in the flow diagram of FIG. 1. In FIG. 2 a feed gas line 51 conducts gas such as sour coke oven gas or another hydrogen sulfide containing fuel gas from some source, not shown, into an MEA absorber 53. The fuel gas passes up through the absorber 53, which absorber may be of various types such as a spray apparatus or a bubble cap apparatus or other type absorption column, and the desulfurized gas passes out of the top of the absorber 53 through the line 55. The absorbent solution, which in the case shown is an aqueous MEA solution containing approximately 20% monoethanolamine, passes into the absorber from the line 57 through a distributer 59. The MEA solution is then collected at the bottom of the absorber in the reservoir portion 61 of the absorber 53 and is pumped from the bottom of the absorber 53 through the line 63, the pump 65 and line 67 through heat exchanger 69 into stripping column 71 through a distributer 73. The MEA solution, which contains hydrogen sulfide, carbon dioxide and other sulfur components passes down through the stripping column 71 countercurrently with respect to hot vapors rising from the bottom of the stripper. The heat from these vapors causes the hydrogen sulfide and carbon dioxide, and other gases which may be dissolved into the MEA solution, to be stripped from the solution and to pass out of the top of the stripping column through the line 75 as a concentrated gas containing a large percentage of hydrogen sulfide plus other acid gases. The concentration of the hydrogen sulfide in line 75 may range up to as much as 40% of the volume of the gas at ambient saturated conditions and the gas may also contain other gases such as carbonyl sulfide and carbon disulfide in addition to a fairly large percentage of carbon dioxide. The partially stripped MEA solution gathers in the bottom of the stripper 71 in a reservoir portion 77. This MEA solution is passed through the line 79 into a reboiler 81 where a portion is vaporized and said vapors are passed through a line 83 back into the bottom of the stripper 71 where it rises up through the stripper 71. The reboiler 81 obtains its heat from steam supplied through a steam line 85. A second line 86 from the bottom of the reboiler 81 conducts stripped MEA solution via pump 87 to the line 89 which conducts the hot stripped MEA solution through the heat exchanger 69 and into a cooling coil 91 which serves to cool the solution before it passes through line 57 into the distributer 59 through which the MEA solution is fed into the absorber 53.

The acidic foul gas passes through condenser 74 and line 75 to a burner 93 which is supplied with oxygen in the form of $O_2$ from the atmosphere through line 95. The oxygen is supplied in a stoichimetric amount sufficient to oxidize approximately one third of the hydrogen sulfide contained in the gas passing through the line 75 into the burner 93. The combined gas is then passed into a thermal reactor 97 which is positioned adjacent to the burner 93. In the thermal reactor the hydrogen sulfide in the gas plus the sulfur dioxide which has been formed in the burner 93 partially combine in accordance with the well known Claus Reaction II above to form elemental sulfur and water. Some of the heat of the thermal reactor is used in the boiler 99 which is fed with water from line 101 to provide process steam through the line 103.

The partially reacted gases pass from the thermal reactor 97 through a line 105 which passes to a condensor 107 where the vaporized elemental sulfur is condensed. The gas and condensed vapor are then passed through line 111 into a condensate reservoir 109 where the molten sulfur collects. The uncondensed vapors and gases pass through the condensate reservoir 109 into the line 113 through heat exchanger 115 where a heat source such as hot oil from a line 119 reheats the vapors to reaction temperature and into a catalytic reactor 117 where additional hydrogen sulfide and sulfur dioxide react with each other in accordance with the well known Claus Reaction II above to form additional vaporized elemental sulfur and water.

The hot gases pass through line 121 into the condensor 123 where vaporized sulfur particles are condensed into a liquid sulfur which is then caught in a condensate reservoir 125 after having passed through line 127. The remaining gases and vapors pass from the reservoir 125 through the line 129 into the heat exchanger 131 where a heat source such as hot oil derived from line 135 again reheats the gas to reaction temperature and thence to a second catalytic reactor 133. The action of the catalytic reactor 133 is the same as the catalytic reactor 117 and thus additional hydrogen sulfide and sulfur dioxide which may not have reacted in the first stage catalytic reactor 117 reacts in the second stage reactor 133. The hot gases and vapors then pass from the catalytic reactor 133 through line 137 into a condenser 139 where the gases and vapors are cooled until the vaporized elemental sulfur condenses into molten sulfur which then passes through line 141 into the third sulfur reservoir 143. While a three stage Claus reactor arrangement comprised of one thermal reactor and two catalytic reactors has been shown for purposes of illustration, it should be understood that other arrangements using more or less stages and particularly two or even one stage could also be used.

Liquid sulfur from the first, second and third condensate reservoirs 109, 125 and 143 respectively passes through the line 145, 147 and 149 respectively into a common line 151 and then through line 153 to a sulfur storage reservoir 155. It will be understood that the sulfur storage reservoir 155 will store the sulfur in a molten condition. The molten sulfur may then be pumped periodically to tank trucks or the like or the molten sulfur may be continuously pumped to some subsequent use. Alternatively the sulfur storage may constitute storage facilities for solid elemental sulfur product. In this case the sulfur will ordinarily be pumped through the respective lines to the sulfur storage and pumped onto a pile of already solidified sulfur allowing the molten sulfur to solidify on the pile for temporary storage.

The uncondensed vapors from the catalytic reactor 133 and condenser 139, which vapors constitute the Claus plant tail gas, pass through the sulfur reservoir 143 and out the line 157 which leads to a catalytic hydrogenation reactor 159. Just prior to entrance into the catalytic reactor 159 the tail gas is joined by a stream of hydrogen or hydrogen containing gas which passes into the tail gas line 157 through a line 161 either from a hydrogen source 163 or preferably from the original feed gas line by way of line 165. The line 165 will be referred to for convenience here as a bypass line 165. This line serves to conduct coke oven gas from the feed line 51 to the line 161 which conducts the gas into the tail gas line 157 and thence to the catalytic reactor 159. It will be understood that the hydrogen source 163 will serve if desired to increase the percentage of hydrogen in the coke oven gas in line 165 so that not so much coke oven gas need be fed to the catalytic reactor 159. However, it will also be understood that the hydrogen source 163 will preferably not be used at all or at most will be used only intermittently during such times as insufficient hydrogen may be found in the coke oven gas for normal hydrogenation of the tail gas from the last catalytic reactor. If preferred the hydrogen source 163 can be completely omitted and hydrogen from the coke oven gas bypass line relied upon as a source. As a further alternative, and particularly if the extra hydrogen source 163 is included for occasional or continuous enrichment of the gas stream, the desulfurized gas in line 55, which contains a somewhat decreased concentration of hydrogen, may be tapped off for use in the catalytic reactor 159.

Catalytic reactor 159 may take various forms. However, as illustrated the catalytic reactor is a fixed bed reactor containing sulfided cobalt molybdate supported on an alumina substrate. In the catalytic reactor 159 the small gas entrained particles or vapor of elemental sulfur will be reacted with hydrogen in the form of $H_2$ to form hydrogen sulfide. The gas carbonyl sulfide will be reacted with hydrogen in the form of $H_2$ to form methane plus water and hydrogen sulfide, any carbon disulfide vapor will be reacted with hydrogen to form methane and hydrogen sulfide, and sulfur dioxide gas will be reacted with the hydrogen to form hydrogen sulfide plus water. It will readily be understood by those skilled in the art that sufficient hydrogen must be provided in the hydrogenating gas to completely hydrogenate all of the above compounds. Normally this will involve the use of more than a stoichiometric amount of hydrogen or hydrogen containing gases, for example, an excess of hydrogen of perhaps 30 to 60% or even more. If some of the original fuel gas such as coke oven gas is used as the hydrogenating gas there will be no problem in using a very substantial excess of such gas since it is all ultimately recycled through the defulfurizing equipment in any event.

It will be understood that since the Claus reaction process is essentially a high temperature process that the original hydrogen sulfide in the coke oven gas will have tended to form by reaction with the hydrocarbons and carbon oxides additional carbonyl sulfide and carbon disulfide above and beyond the original carbonyl sulfide and carbon disulfide content of the coke oven feed gas. These carbon sulfide gases are in themselves quite poisonous so it is advantageous to remove them from the tail gas. As has been set forth above, it has frequently been past practice, because of the high toxicity of these gases, to incinerate the tail gas in order to convert the gases to the less toxic though still objectionable sulfur dioxide gas prior to exhaustion to the atmosphere. In accordance with the present invention, however, the sulfur content of these gases can now be reconverted into their original hydrogen sulfide form and the hydrogen sulfide can be recycled through the line 167 back to the original feed gas line 51 or alternatively directly to the hydrogen sulfide absorber 53. The alkanolamine absorber and particularly the MEA absorbing solution is particularly efficient in the removal of hydrogen sulfide from the original gas stream and it will be understood that substantially all of the hydrogen sulfide is removed from the gas stream, which includes the recycled gas, at this point. After absorption and desorption the hydrogen sulfide is again recycled through the Claus plant where a major proportion of it will be converted into elementary sulfur which can be removed from the system.

By operation of a sulfur removal and recovery process in accordance with the present invention a very selective removal of all sulfur can be effected upon the original gas stream in a most economical and efficient manner without the discharge of any deleterious sulfur containing tail gas from the system at all. Furthermore, the process in accordance with the invention is a completely closed and substantially self-contained system which has no input except the original gas which is to be desulfurized and has no output except for the clean gas which is discharged for use elsewhere and the sulfur product which is also available for use in some subsequent process.

It will be noted that the MEA solution or other absorbent solution which is used is continuously recycled and reused and that the hydrogen which is used is, in the preferred embodiment, obtained from the original coke oven gas or other fuel gas. The heat of the reaction in the thermal reactor of the Claus unit provides heat for making the process steam which is used for example in the reboiler 81. Since all the hydrogen sulfide which passes through the Claus plant unchanged is eventually recycled into the absorber, and since all the sulfur dioxide, carbonyl sulfide and sulfur disulfide which are derived from the Claus plant thermal reactor and catalytic reactors is hydrogenated and converted back into hydrogen sulfide and recycled again to the absorber, it will be seen that it is not as important as in many Claus reaction processes for the exact stoichimetric ratio of the hydrogen sulfide and sulfur dioxide to be maintained in the Claus plant since minor variations in the amount of either sulfur dioxide or hydrogen sulfide given off by the Claus reactors are easily absorbed by the overall system without the exhaustion to the environment of any deleterious sulfur containing gases in a tail gas. The monitoring of the process in accordance with the present invention thus need not be as severe or critical as in most Claus type plants in order to prevent possible pollution of the environment with sulfur gases.

While a two stage catalytic reaction has been shown in the Claus reaction apparatus shown in FIG. 2 as an example, a single stage reaction sequence may also be very desirably used. This will save the expense of additional stages of catalytic reactors in the Claus plant. The capital expense of the process may, therefore, be decreased without a corresponding decrease in the effectiveness of the entire system. This is particularly true in the case where all the hydrogen for the operation of the process is obtained by use of the original coke oven gas as a hydrogen donor gas which can then be recycled back to the absorber of the alkanolamine desulfurizer system.

As one example of the process of the invention, a coke oven gas containing 2% carbon dioxide, 0.5% hydrogen sulfide and traces of carbonyl sulfide and carbon disulfide is passed to a MEA absorption-desorption desulfurization plant. In the absorber of the absorption-desorption apparatus substantially all of the hydrogen sulfide is absorbed leaving only 0.01% hydrogen sulfide in the desulfurized or clean coke oven gas. This gas will also contain about 1.5% carbon dioxide. The foul gas stripped from the desorption apparatus of the absorber-desorber system is passed to a Claus plant. This foul gas will contain about 40% hydrogen sulfide, about 50% carbon dioxide and diminishing percentages of other gases such as hydrogen cyanide, carbon disulfide and carbonyl sulfide. In the Claus plant, oxygen is first reacted with approximately one third of the hydrogen sulfide content of the gas and the resulting sulfur dioxide is then reacted with the hydrogen sulfide to form sulfur and water. The tail gas derived from the Claus plant will contain about 0 to 1 percent hydrogen sulfide, 0 to 1 percent carbonyl sulfide, 0 to 0.5 percent carbon disulfide and 0 to 1 percent sulfur dioxide as examples. This gas is combined with about 50 percent stoichiometric excess of the original coke oven gas based upon the hydrogen content of the coke gas and is passed through a tail gas hydrogenation reactor where substantially all of the elemental sulfur vapor, carbonyl sulfide, carbon disulfide and sulfur dioxide are hydrogenated to form hydrogen sulfide and other products as set forth above. The tail gas, which now contains about 2.5% hydrogen sulfide, 13% methane, 15% water, 6% carbon dioxide and which is completely free of any sulfur dioxide, the passes back into the feed line for the coke oven gas.

By operation in accordance with the invention with a full recycle loop in combination with a catalytic hydrogenation step, preferably using a portion of the original fuel gas as the hydrogenating medium, an extremely efficient sulfur removal system is provided from which no tail gas sulfur at all can escape. The process will be found to be both efficient, practical, and economical in effecting substantially complete removal of all sulfur components from a feed gas leaving substantially no sulfur to be exhausted to the environment.

We claim:

1. In a method of desulfurizing a hydrogen sulfide and hydrogen containing fuel gas without exhausting any sulfur containing tail gas including:

(a) contacting a hydrogen sulfide and hydrogen containing feed fuel gas with an absorbing solution to absorb substantially all hydrogen sulfide from said feed fuel gas and generate a substantially desulfurized fuel gas, (b) desorbing said hydrogen sulfide from said absorbing solution and passing said desorbed hydrogen sulfide to a Claus reaction zone together with an approximately stoichiometric amount of sulfur dioxide based upon the amount of hydrogen sulfide which is to be reacted with sulfur dioxide in said reaction zone to form elemental sulfur and water leaving a tail gas with sulfur components, the improvement comprising:

(c) conducting a portion of a fuel gas of step (a) to a catalytic hydrogenation zone in a quantity sufficient to provide at least an amount of hydrogen to stoichiometrically react with any sulfur dioxide, carbonyl sulfide, carbon disulfide and elemental sulfur vapors contained in the tail gas from step (b), (d) conducting the tail gas from the reaction of sulfur dioxide with hydrogen sulfide in step (b) to the catalytic hydrogenation zone of step (c) and reacting sulfur dioxide, carbonyl sulfide, carbon disulfide and elemental sulfur vapors in said tail gas with the hydrogen in said fuel gas to form hydrogen sulfide plus additional amounts where appropriate of methane and water and form a hydrogenated tail gas, and (e) recycling said hydrogenated tail gas with no substantial sulfur content in a form other than hydrogen sulfide to contact said absorbing solution of step (a) simultaneously with said hydrogen sulfide and hydrogen containing feed fuel gas.

2. A method according to claim 1 wherein sufficient fuel gas is conducted to the hydrogenation zone in step (c) to provide an excess of hydrogen of 30% to 60% over the stoichiometric amount necessary to react with sulfur components in step (d).

3. A method according to claim 2 wherein the Claus reaction zone is comprised of not more than two Claus catalytic reaction stages.

4. A method according to claim 3 wherein the Claus reaction zone is comprised of not more than one Claus catalytic reaction stage.

5. A method according to claim 1 wherein the fuel gas of step (a) from which a portion is conducted to the catalytic hydrogenation zone is the hydrogen sulfide and hydrogen containing feed fuel gas.

6. A method according to claim 1 wherein the fuel gas of step (a) from which a portion is conducted to the catalytic hydrogenation zone is the desulfurized fuel gas.

7. A method according to claim 1 wherein the absorbing solution is an aqueous ethanolamine.

8. A method according to claim 5 wherein the portion of the fuel gas conducted to the catalytic hydrogenation zone is conducted from the hydrogen sulfide and hydrogen containing feed fuel gas to the catalytic hydrogenation zone prior to recycling the hydrogenated tail gas back to the hydrogen sulfide and hydrogen containing feed fuel gas stream.

9. A method according to claim 1 wherein the hydrogen sulfide and hydrogen containing feed fuel gas is coke oven gas.

10. A method according to claim 5 wherein the hydrogen sulfide and hydrogen containing feed fuel gas is coke oven gas.

11. A method according to claim 6 wherein the hydrogen sulfide and hydrogen containing feed fuel gas is coke oven gas.

12. A method according to claim 1 wherein the hydrogenated tail gas is recycled into the hydrogen sulfide and hydrogen containing fuel feed gas prior to contact of the feed fuel gas with the absorbing solution.

13. A method according to claim 12 wherein the fuel gas of step (a) from which a portion of conducted to the catalytic hydrogenation zone is the hydrogen sulfide and hdyrogen containing feed fuel gas.

14. A method according to claim 12 wherein the fuel gas of step (a) from which a portion is conducted to the catalytic hydrogenation zone is the desulfurized fuel gas.

15. A method according to claim 1 wherein additional hydrogen from a separate hydrogen source is fed into the hydrogenation reactor with the fuel gas of step (a).

* * * * *

UNITED STATES PATENT OFFICE
CERTIFICATE OF CORRECTION

Patent No. 4,085,199          Dated April 18, 1978

Inventor(s) Alan H. Singleton et al.

It is certified that error appears in the above-identified patent and that said Letters Patent are hereby corrected as shown below:

Col. 1, line 36, "desortior" should read --desorption--.

Col. 12, line 26, "sulifide" should read --sulfide--.

Col. 14, line 10, "hydrocabons" should read --hydrocarbons--.

Col. 15, line 53, the word "the" first occurrence should read --then--.

Col. 17, claim 13, line 2, "portion of" should read --portion is--

Signed and Sealed this

Tenth Day of October 1978

[SEAL]

Attest:

RUTH C. MASON
*Attesting Officer*

DONALD W. BANNER
*Commissioner of Patents and Trademarks*